Figure 1:

(No Model.)

L. ARONSON.
MATCH AND COMPOSITION FOR SAME.

No. 592,227.  Patented Oct. 26, 1897.

Witnesses:
Edwin B. Hopkinson.
G. B. Lewis.

Louis Aronson, Inventor
by Kerr, Curtis & Page Attys.

UNITED STATES PATENT OFFICE.

LOUIS ARONSON, OF NEW YORK, N. Y.

MATCH AND COMPOSITION FOR SAME.

SPECIFICATION forming part of Letters Patent No. 592,227, dated October 26, 1897.

Application filed December 29, 1896. Serial No. 617,319. (No model.)

*To all whom it may concern:*

Be it known that I, LOUIS ARONSON, a citizen of the United States, residing at New York, in the county and State of New York, have invented certain new and useful Improvements in Matches, of which the following is a specification.

The invention, subject of my present application, is an improvement in "fusees" or matches which, after ignition, will continue to burn with such persistence as not to be extinguished by ordinary drafts or winds.

Matches of this kind have heretofore been made by applying to a suitable stem, either by dipping or otherwise, a substance having the property of persistent combustibility, and providing for its ignition by applying to it as a head, usually by dipping, a small quantity of an ignitible composition such as is used in ordinary friction-matches. Such matches have not been, to any extent, waterproof, unless when coated with a varnish or some special waterproofing compound, for it is not feasible, so far as I am aware, to obtain a composition which shall have the property of ready ignition by friction and at the same time be capable of retaining such property after being exposed to the action of moisture. The application of an external coating of waterproofing material, however, adds materially to the cost of manufacture of the matches, as it is practically necessary to dip and dry the completed matches in order to obtain it.

The primary object of my invention is to produce a cheap wind-match or fusee which shall be capable to a high degree of withstanding the action of moisture, but in the material which I have discovered and applied in securing this object I have secured novel qualities of great practical advantage.

My improved match consists of a stick or stem which may or may not be combustible, with a head composed of an ignitible compound covered or coated with a combustible compound which burns with great persistence. Usually, in fact, my match is a friction-match, such as an ordinary parlor or safety match, dipped in a suitable compound, so that its head and a portion of the stick or stem adjacent thereto receives an adherent coating of such compound.

Inasmuch as the combustible compound should be waterproof or but to a small extent affected by moisture, and as the coating which has to be worn off to expose the ignitible head in rubbing the match to light it must be comparatively thin, yet capable of maintaining combustion for some time, careful and extended experiment was necessary before I was enabled to obtain a substance or compound possessing the necessary properties and at the same time produce a practical and marketable match.

The composition which best meets all the requirements of my invention I have found to consist of the following ingredients in substantially the proportions given: Twenty parts chlorate of potash, forty parts chromate of lead, twenty-five parts gum-benzoin, ten parts dextrine, five parts charcoal, five parts shellac, fifty parts amorphous phosphorus, five parts gum-sandarac, five parts sulfuret of antimony. I have also found the best results to follow from dissolving the chlorate of potash in warm water and adding to it and mixing thoroughly after each addition the several ingredients in the order named. The dextrine, however, may be added at any time without apparently modifying the result.

The insoluble ingredients—the gums benzoin, shellac, and sandarac and the charcoal—are added in a finely-powdered condition, and gelatin or glue is used as a binder. I usually add to the mixture also a small quantity of powdered pumice-stone, and bring the whole mass, after being thoroughly worked, to such a consistency that a comparatively thin coating of the composition will adhere to the sticks or matches dipped in it.

This composition possesses several very desirable qualities. When once ignited, it burns persistently with a comparatively steady flame, with an odor by no means disagreeable. It is not readily ignited except by contact with bodies already under combustion or at high temperatures. It is to a high degree waterproof, and when applied as a coating to any kind of friction-match it not only protects the latter from the action of moisture, but will burn itself when wet. To ignite a match coated with this material requires but slightly more friction than when it is not present.

In so far as that part of my invention is concerned which consists in a match combining in itself the several properties of a persistently-burning waterproof match and which is produced by coating a friction-match with a waterproofing composition having the property of persistent combustibility, the mere question of ingredients is secondary and largely immaterial. I have found, however, that the addition to those ingredients which readily yield up their oxygen and those which have a strong affinity for it and which constitute essential elements of any persistently-combustible compound of the gums named or any other suitable resinous material in a fine state of division, so as to enter into very perfect mechanical union with the same, affords the best means of protecting the said material from the effects of moisture while preserving the other qualities which its employment in this connection demands; but, as will now be evident from the description of the nature and properties of the special compound which I employ, it contains in itself qualities which are both new and desirable. I therefore regard it as a part of my invention or discovery whether it be applied or used as a coating for a friction-match or in any other way common in fusees or wind-matches generally.

Figure 2:

In the drawings I have shown in Figure 1 a sectional view of a wind-match made according to my invention, and in Fig. 2 a sectional view illustrating another way in which my improved composition may be used.

In Fig. 1, A is a stick or stem of any kind, preferably that of any ordinary friction-match, with an ignitible head B. Over this head and a portion of the stem adjacent thereto is the coating C of persistent combustibility.

In Fig. 2, where similar letters designate corresponding parts, the ignitible head is on the outside of the other material.

Having now described my invention, what I claim is—

1. A fusee or wind-match consisting of a stem with a head ignitible by friction, the ignitible head and the stem adjacent thereto being coated with and enveloped by a material non-ignitible by friction, but having the property of persistent combustibility, as set forth.

2. A fusee or wind-match consisting of a stem with a head ignitible by friction, which, together with a portion of the stem adjacent thereto, is coated with and enveloped by a waterproofing material not ignitible by friction, and having the property of persistent combustibility, as set forth.

3. The material for wind-matches hereinbefore described consisting essentially of chlorate of potash, chromate of lead, amorphous phosphorus, sulfuret of antimony, dextrine, charcoal and one or more resinous gums in substantially the proportions stated.

LOUIS ARONSON.

Witnesses:
MAX HECHT,
D. BUCHANAN.